United States Patent
Mayr et al.

(10) Patent No.: US 9,909,599 B2
(45) Date of Patent: Mar. 6, 2018

(54) PRESSURE ACCUMULATOR WITH A CONNECTION DEVICE

(71) Applicant: MAGNA STEYR Fahrzeugtechnik AG & Co KG, Graz (AT)

(72) Inventors: Franz Mayr, St. Marein bei Graz (AT); Carsten Schmidt, Allerheiligen bei Wildon (AT); Alexander Schärfl, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 150 days.

(21) Appl. No.: 13/859,925

(22) Filed: Apr. 10, 2013

(65) Prior Publication Data

US 2013/0269814 A1    Oct. 17, 2013

(30) Foreign Application Priority Data

Apr. 11, 2012  (EP) .................................... 12163773

(51) Int. Cl.
| | |
|---|---|
| *F16L 55/04* | (2006.01) |
| *F15B 1/08* | (2006.01) |
| *F17C 5/00* | (2006.01) |

(52) U.S. Cl.
CPC .................. *F15B 1/08* (2013.01); *F17C 5/00* (2013.01); *Y02E 60/321* (2013.01)

(58) Field of Classification Search
CPC ............. F15B 1/08; F17C 5/00; Y02E 60/321
USPC ........ 138/30; 137/797, 266, 263, 265, 68.14
See application file for complete search history.

(56) References Cited

U.S. PATENT DOCUMENTS

| | | | |
|---|---|---|---|
| 2,310,021 A | 2/1943 | Heidbrink | |
| 4,722,333 A | 2/1988 | Bartos | |
| 4,800,923 A | 1/1989 | Bartos | |
| 5,613,490 A * | 3/1997 | Mayes et al. | 128/205.22 |
| 5,615,702 A | 4/1997 | Dawans | |
| 5,676,180 A * | 10/1997 | Teel | 141/18 |
| 5,884,675 A * | 3/1999 | Krasnov | 141/18 |
| 6,082,359 A * | 7/2000 | Preston | 128/205.24 |
| 6,227,230 B1 * | 5/2001 | Huh | 137/265 |
| 7,624,753 B2 * | 12/2009 | Suess et al. | 137/266 |
| 8,113,548 B2 * | 2/2012 | Gunderson | 285/319 |
| 2002/0129867 A1 * | 9/2002 | Krasnov | 141/11 |

(Continued)

FOREIGN PATENT DOCUMENTS

| | | |
|---|---|---|
| CN | 1463343 A | 12/2003 |
| CN | 101466975 A | 6/2009 |

(Continued)

OTHER PUBLICATIONS

Chinese Patent Application No. 201310124366.5 Search Report, dated Aug. 18, 2014, pp. 1-3, Mechanical Invention Examination Department, Guangdong Patent Examination Cooperation Center, China.

*Primary Examiner* — Vishal Pancholi
(74) *Attorney, Agent, or Firm* — Jordan IP Law, LLC; Todd A. Vaughn

(57) ABSTRACT

A pressure accumulator with a connecting device, in which the pressure accumulator and the connecting device are connected together fluid-conductively. The pressure accumulator at a first axial connecting segment has a transverse bore which intersects an axial bore of the pressure accumulator, in which the transverse bore is configured for fluid-conductive connection with the connecting device.

17 Claims, 8 Drawing Sheets

(56) References Cited

U.S. PATENT DOCUMENTS

| | | |
|---|---|---|
| 2003/0146214 A1 | 8/2003 | Idoguchi |
| 2004/0159352 A1 | 8/2004 | Friedlmeier et al. |
| 2006/0283519 A1 | 12/2006 | Campbell |
| 2007/0261756 A1* | 11/2007 | Handa .............................. 141/4 |
| 2008/0196766 A1* | 8/2008 | Gandy ....................... 137/68.14 |
| 2010/0059138 A1 | 3/2010 | Shi et al. |
| 2011/0088811 A1* | 4/2011 | Shudo et al. ................. 141/248 |
| 2012/0319398 A1* | 12/2012 | Schweizer et al. ........... 285/308 |

FOREIGN PATENT DOCUMENTS

| | | |
|---|---|---|
| DE | 19812904 A1 | 11/1999 |
| DE | 10206502 C1 | 8/2003 |
| DE | 202006004434 U1 | 3/2006 |
| EP | 1336794 A2 | 8/2003 |
| JP | S57-115500 A | 7/1982 |
| JP | S57-115500 U | 7/1982 |
| JP | H07-149156 A | 6/1995 |
| JP | 2002-340208 A | 11/2002 |
| JP | 2002-340298 A | 11/2002 |
| JP | 2003-262299 A | 9/2003 |
| JP | 2005-188538 A | 7/2005 |
| JP | 2011-179519 A | 9/2011 |
| WO | 03006309 A1 | 1/2003 |
| WO | 2007144919 A2 | 12/2007 |

* cited by examiner

PRESSURE ACCUMULATOR WITH A CONNECTION DEVICE

CROSS-REFERENCE TO RELATED APPLICATIONS

The present application claims priority under 35 U.S.C. § 119 to European Patent Application No. EP 12163773.0 (filed on Apr. 11, 2012), which is hereby incorporated by reference in its entirety.

TECHNICAL FIELD

Embodiments are directed to a pressure accumulator with a connecting device, in which the pressure accumulator and the connecting device are configured for connection together fluid-conductively.

BACKGROUND

Pressure accumulators serve to receive pressurised fluids. In particular pressure accumulators are used as fuel tanks for vehicles and then contain gasses, for example, CNG, mixed gasses or hydrogen, or fluids such as LPG or LNG at high pressures. The pressure accumulators are usually produced as cylindrical bottles. It is also known to combine several pressure accumulators in one module. This allows a common access to several pressure vessels. The pressure accumulators are usually connected to connecting devices via screw connections.

A fuel container assembly for storing pressurized gasses for a motor vehicle, with several individual fuel containers each with an end opening for filling and evacuation of the container, which assembly furthermore comprises a collector and a holder part, in which the fuel containers are connected firstly with their openings to the collector and secondly mechanically to the holder part and thus the individual fuel containers are held together into a unit by the collector and holder part, is known from DE 20 2006 004 434 U1.

Furthermore, DE 102 06 502 C1 describes a pressurised gas tank system with at least two substantially identical gas containers, in which the gas containers have a base part and an extraction part and openings allocated to the extraction parts. A shut-off valve is allocated to the extraction parts, in which the extraction parts with their openings protrude into a connecting rail connecting the extraction parts together. The openings are connected with a gas channel running in the connecting rail, in which a shut-off valve is allocated to the connecting rail at a gas channel outlet and forms the shut-off valve common to all gas containers.

DE 198 12 904 A1 discloses a device for storage of pressurised gas with a multiplicity of storage containers, in which each storage container has a header piece and the respective header pieces are or may be connected together in a modular fashion. The pressurised gases are conducted from the storage containers via a flow channel which is provided in the header piece and communicates via a bore with the cavity of the respective storage container. The individual header pieces are connected via connecting elements which are introduced in corresponding openings in the header pieces.

SUMMARY

Embodiments are directed to an enhanced pressure accumulator and a connecting devices for the same in which a simple and secure connection between the pressure accumulator and the connecting device is realized.

In accordance with embodiments, a pressure accumulator with a connecting device is provided, whereby the pressure accumulator and the connecting device are configured for connection to each other fluid-conductively. The pressure accumulator at a first connecting segment has a transverse bore which intersects an axial bore of the pressure accumulator, and the transverse bore is configured for fluid-conductive connection with the connecting device.

In accordance with embodiments, an axial bore is provided in a connecting segment of the pressure accumulator. This axial bore extends or otherwise protrudes from the pressure accumulator and permits the connection with further external fluid channels.

In accordance with embodiments, the axial bore is intersected by a transverse bore. The transverse bore preferably stands perpendicular to the axial bore and is thus arranged parallel to the delimiting wall of the pressure accumulator in the connecting segment. The transverse bore may therefore easily and reliably be connected to bores of a connecting device which also lie transverse to the pressure accumulators, in particular, via a push-fit connection.

In accordance with embodiments, the term "bore" means any linear opening in a surrounding body. The production process for the opening is not established or otherwise limited by this term. Apart from the production of the opening by drilling, other methods are also included, for example, the forming of a profile.

In accordance with embodiments, the connecting device is configured for fluid-conductive connection with a second pressure accumulator. The pressure accumulator, therefore, forms a part of a pressure accumulator assembly which comprises a plurality, but at least two, pressure accumulators.

In accordance with embodiments, on the first connecting segment of the pressure accumulator on both sides of the transverse bore are arranged sealing rings configured to fluidic seal between the pressure accumulator and the connecting device.

In accordance with embodiments, the first connecting segment of the pressure accumulator is connected with the connecting device via one of a push-fit connection, clamp connection or a snap-lock connection. This advantageously allows rapid assembly and, depending on design requirements, also rapid disassembly of the pressure accumulator. In this regard, for example, a free-standing receiver may be provided for an assembly or disassembly tool or a bore for dismantling.

In accordance with embodiments, the push-fit connection is formed as a biasing mechanism such as a spring element, in particular, a locking ring, a crescent-shaped locking ring, bolt or screw in the connecting segment, which comes to lie in a groove of the connecting device.

In accordance with embodiments, an axial movement space for the push-fit connection, in particular for the spring element, in particular a movement space, is formed in a groove of the connecting device. This allows the push-fit connection a defined play in the groove on length changes of the pressure accumulator.

In accordance with embodiments, the connecting device is configured for mounting in a vehicle and for mounting the pressure accumulator. The connecting device thus includes a stable frame which is pre-mounted in a vehicle. The individual pressure accumulators are inserted in this frame and are configured to move in the frame in accordance with a predefined movement play.

In accordance with embodiments, the first connecting segment of the pressure accumulator is configured for connection with the connecting device via a mechanical connection such as, for example, a screw. In particular, for this a screw, a nut and/or a split pin are used.

In accordance with embodiments, a pressure accumulator component, in particular a valve, is arranged in the axial bore of the pressure accumulator.

In accordance with embodiments, the connecting device has an opening in the region of the axial bore of the pressure accumulator. This advantageously allows good access from the outside, in particular, to a pressure accumulator component arranged in the axial bore. The opening may be covered with a cover, in which the cover is configured to indicate the state of seal of the pressure accumulator and also to prevent penetration of undesirable articles into the opening such as debris, dirt, etc. Furthermore, the cover may be configured such that a non-destructive dismantling of the pressure accumulator is prevented, and/or unauthorized access is evident. Furthermore, the cover may be configured such that on damage to the seal, the cover, for example, shows a structural indication of such damage. This may come about by the cover curving outward or tearing to thereby detect the seal damage in good time.

In accordance with embodiments, the pressure accumulator has a nominal break point in a first connecting segment, in which, in particular, a flow limiter is also arranged in the pressure accumulator. The nominal break point is arranged in relation to the flow limiter such that the flow limiter remains in the pressure accumulator on breakage at the nominal break point.

In accordance with embodiments, the pressure accumulator has a second connecting segment which is configured for fluid-conductive connection with the connecting device. The second connecting segment in particular is constructed identically to the first connecting segment. The pressure accumulator may, therefore, be connected to the connecting device at two points/areas/segments, in particular, at both ends of a cylindrical pressure accumulator, via a connection in accordance with embodiments.

In accordance with embodiments, at least two pressure accumulators connected with a connecting device form a pressure accumulator assembly. The at least two pressure accumulators are configured for connection to each fluid-conductively and also for connection with the connecting device at the respective first and second connecting segment. The pressure accumulators are connected together at least at two connecting points/areas/segments, for example, at opposite ends of cylindrical pressure accumulators, via the connecting device. Thus, widely varying embodiments of fluid flows are possible within the arrangement, in particular also circuits, since a supply of fluid into one pressure accumulator and an outflow within the pressure accumulator assembly may take place simultaneously. The pressure accumulators are configured to communicate via a separate second channel, for example, during their filling and during extraction of the fluid. Inter alia, this advantageously allows a simplified flushing process.

A flushing process is necessary, for example, if on a final test of seal of the entire assembly, a test fluid is used which does not correspond to the medium stored in the actual application of the pressure accumulator, or if for safety reasons for transport of the pressurised tank arrangement, no filling for example hydrogen is used. For hydrogen storage units, usually helium or nitrogen is used as a test fluid but in use in the vehicle, these may cause damage to the drive unit.

With the connecting arrangement, the free communication of all components and the possibility of installing elements influencing the flow such as cross section reductions, on commissioning in the vehicle a flushing process may be applied. The result is that time, energy and resources are saved. This is achieved, for example, in that the storage fluid to be stored definitively is introduced via a filling valve unit, while the test fluid is discharged or extracted at an extraction valve unit in a targeted fashion. When the quantity corresponding to the entire volume of the assembly has been flushed, the targeted throughflow of all components achieves a high cleanliness of the assembly. A great advantage is that this is achieved even at very low pressure. Thus, advantageously, no filling with test fluid under high pressure is required, with time-consuming discharge and lengthy repetition of the process.

In accordance with embodiments, the first connecting segments of the pressure accumulator are configured for connection with a first connecting element of the connecting device, and the second connecting segments of the pressure accumulator are connected with a second connecting element of the connecting device, in which the first connecting element and the second connecting element are configured for connection to each fluid-conductively exclusively via the pressure accumulator.

In this arrangement the connecting device is formed by two separate connecting elements, in which a first connecting element connects together the first two segments or ends of the pressure accumulator and the second connecting element connects together the second two segments or ends of the pressure accumulator.

In accordance with embodiments, the connecting device is formed mechanically stable. When the connecting device is composed of connecting elements as described hereinabove, preferably the individual connecting elements are designed mechanically stable. In this way, the connecting device or connecting elements that compose a stable frame which serves to receive the pressure accumulators.

In accordance with embodiments, the connecting elements together with linearly formed pressure accumulators, for example, cylindrical pressure accumulators, form a mechanically stable frame, in which the two opposing ends of the pressure accumulators are each connected fluid-conductively with the respective connecting element.

In accordance with embodiments, fixing points are formed for fixing the pressure accumulator assembly, in particular, in a motor vehicle, exclusively on the connecting device. Mounting of the entire pressure accumulator assembly takes place accordingly via the connecting device. Elastic elements such as rubber mountings may be integrated at the fixing points, for example, suspension or mounting receivers of the connecting device. These guarantee absorption of length changes and position changes of the pressure accumulators. Length changes of the pressure accumulators take place usually evenly because of the simultaneous pressure build-up and reduction through the communicating channels via the connecting segments and the connecting device, so that the elasticity necessary for this is reduced.

In accordance with embodiments, valves and/or valve blocks and/or filters and/or shut-off elements and/or pressure reducers and/or cross section reductions, in particular, a filling valve unit and/or an extraction valve unit, are arranged in or on the connecting device. Components which serve to influence the fluid flow are thus arranged in the connecting device and may be distributed flexibly over the connecting device.

In accordance with embodiments, the pressure accumulators are connected inseparably with the connecting device so that separation of a pressure accumulator from the connecting device is possible only on destruction of a seal and/or with a special tool. This means it is reliably established subsequently whether the end customer has attempted to release the connection between a pressure accumulator and the connecting device. Manipulation of the connection is thus reserved for specialist personnel or workshops.

In accordance with embodiments, the pressure accumulators are connected with the connecting device via a fixed screw connection, in particular by way of a hollow screw.

DRAWINGS

Embodiments are described by way of example below with reference to the drawings.

FIGS. 3 to 7 respectively illustrate front view diagrammatic depictions of various designs of the connection between the pressure accumulator and the connecting device in accordance with embodiments.

Figure 8:
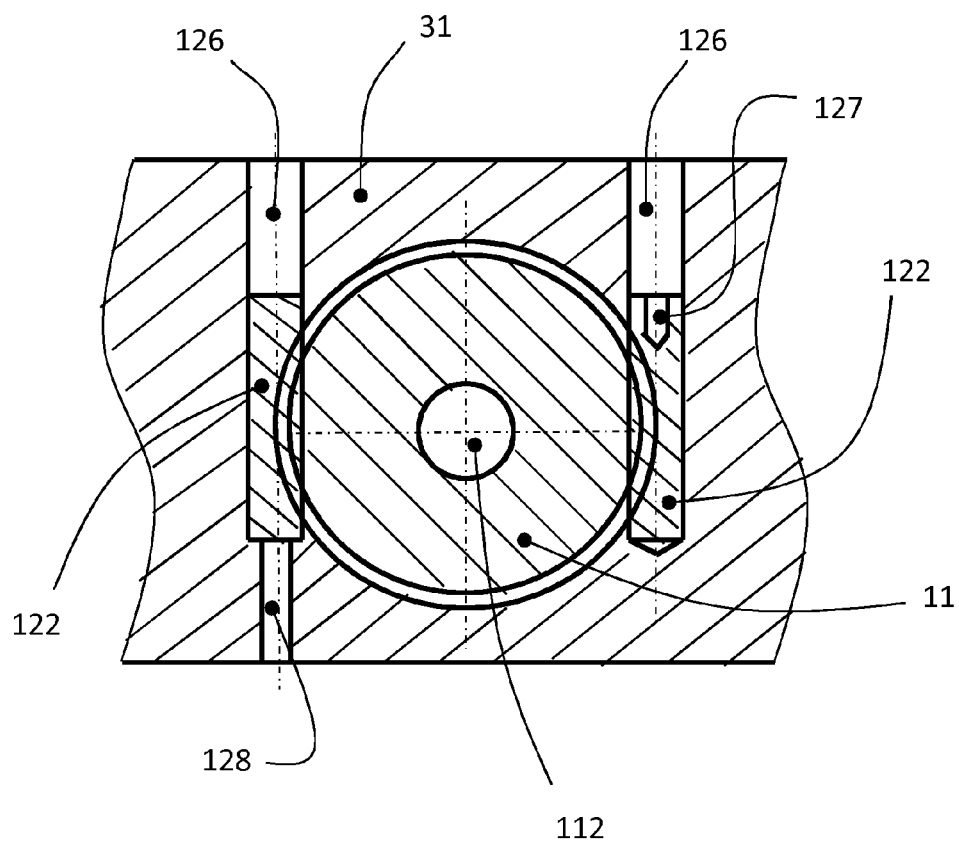

FIG. 8 illustrates a top view diagrammatic depiction of an embodiment of a connection between the pressure accumulator and the connecting device in accordance with embodiments.

Figure 9:
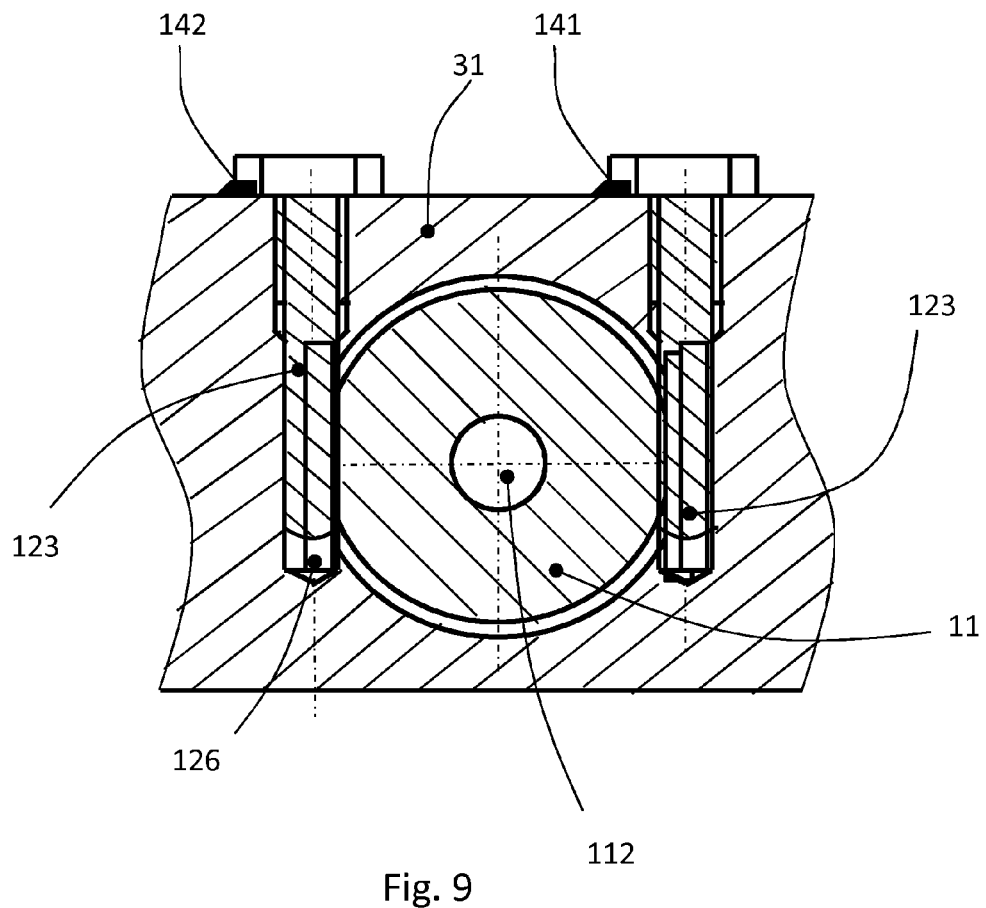

FIG. 9 illustrates a top view diagrammatic depiction of a further design of a connection between the pressure accumulator and the connecting device in accordance with embodiments.

DESCRIPTION

FIGS. 1a to 2b illustrate diagrammatic depictions of various pressure accumulator assemblies.

The pressure accumulator assembly 10 includes cylindrical pressure accumulators 11 which are permanently connected at both ends with connecting elements of a connecting device 31. The pressurised fluid flows out of the pressure accumulators 11 through bores 32 of the connecting elements. The connecting device 31 is formed mechanically stable and is connected suspended or standing at fixing points 41 and 42, for example, in a vehicle. The pressure accumulators 11 are connected with the connecting device 31 via screw connections 50. In or on the connecting device 31 is a temperature-controlled pressure reducer 21, an automatic cylinder valve 23 and a service valve 24, together with valve blocks 12 and 22. The valves 23, 24, valve blocks 12, 22 and similar may be mounted at arbitrary points in or on the connecting device 31.

Furthermore, in the connecting device 31 are arranged cross-section reductions 37. Due to the arbitrary arrangement of the components in the connecting device 31 and the free communication of the pressure accumulators 11 via the connecting device 31, a targeted steering of the flow circuit in the entire system is possible. Above all, due to the arbitrary arrangement of the filling valve unit 33 and the extraction valve unit 34 in the pressure accumulator assembly 10, a simple flushing of the entire system is possible on commissioning. A mechanical fixed connection between the pressure accumulators 11 and connecting device 31 takes place, for example, by way of screw connection 50 and is illustrated in more detail in FIG. 3.

Figure 1A:
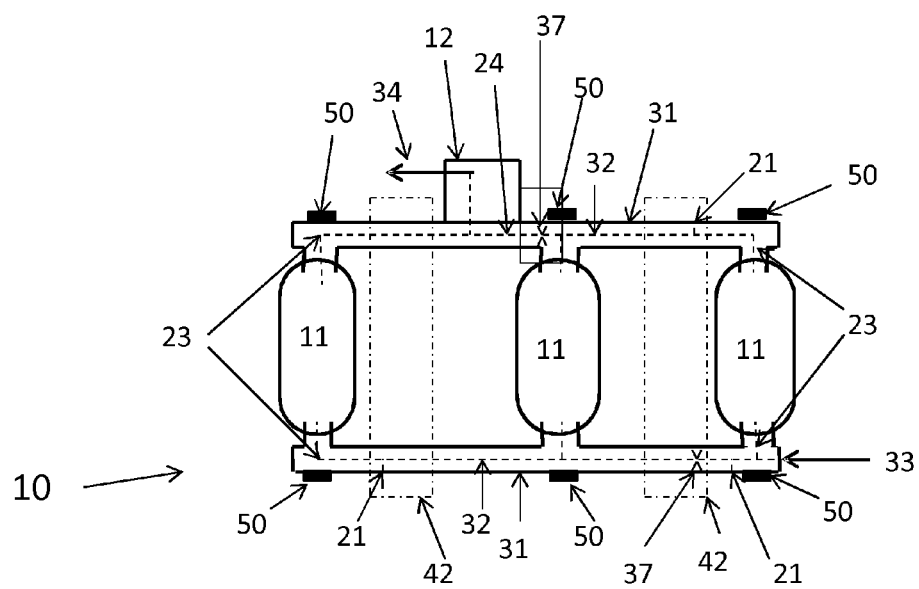
FIG. 1a illustrates a front view diagrammatic depiction of a pressure accumulator assembly in accordance with embodiments.
Figure 1B:
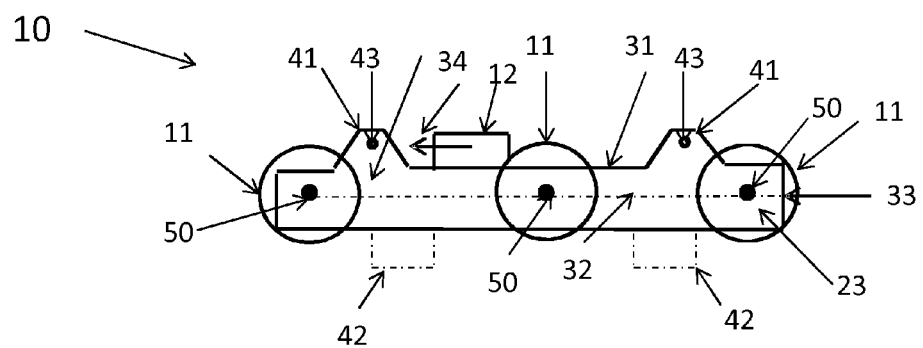
FIG. 1b illustrates a top view diagrammatic depiction of a pressure accumulator assembly in accordance with embodiments.
Figure 2A:
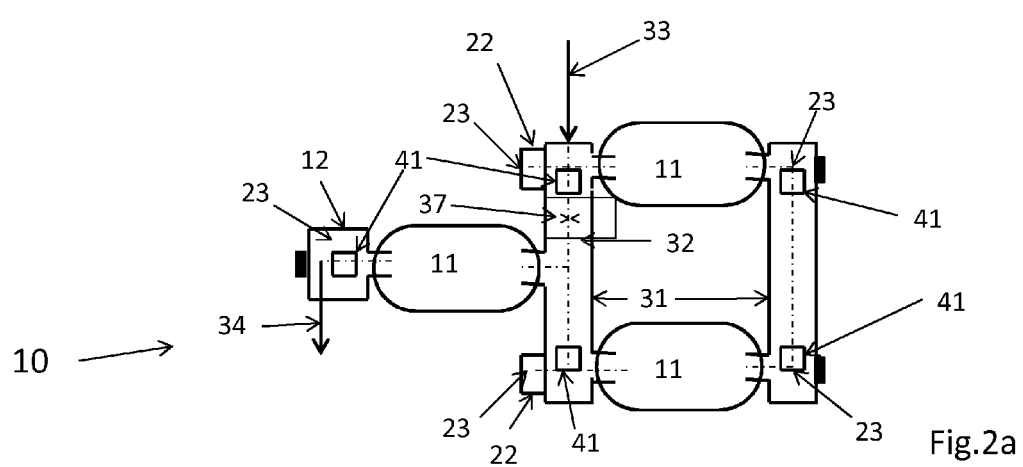
FIG. 2a illustrates a front view diagrammatic depiction of a further pressure accumulator assembly in accordance with embodiments.
Figure 2B:
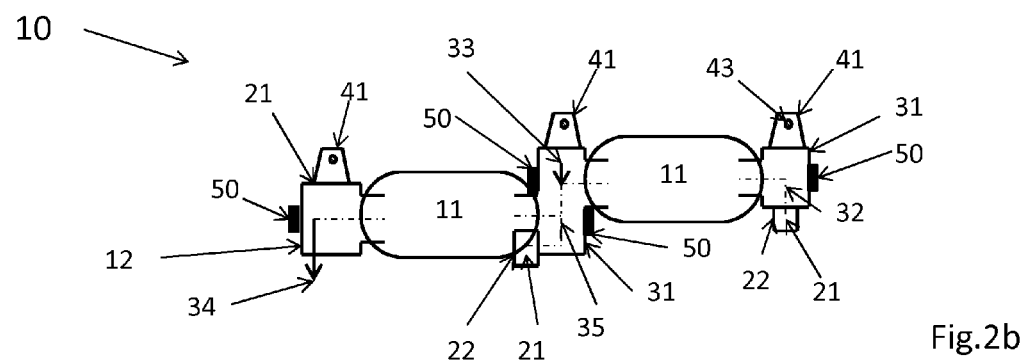
FIG. 2b illustrates a top view diagrammatic description of a further pressure accumulator assembly in accordance with embodiments.
Figure 3:
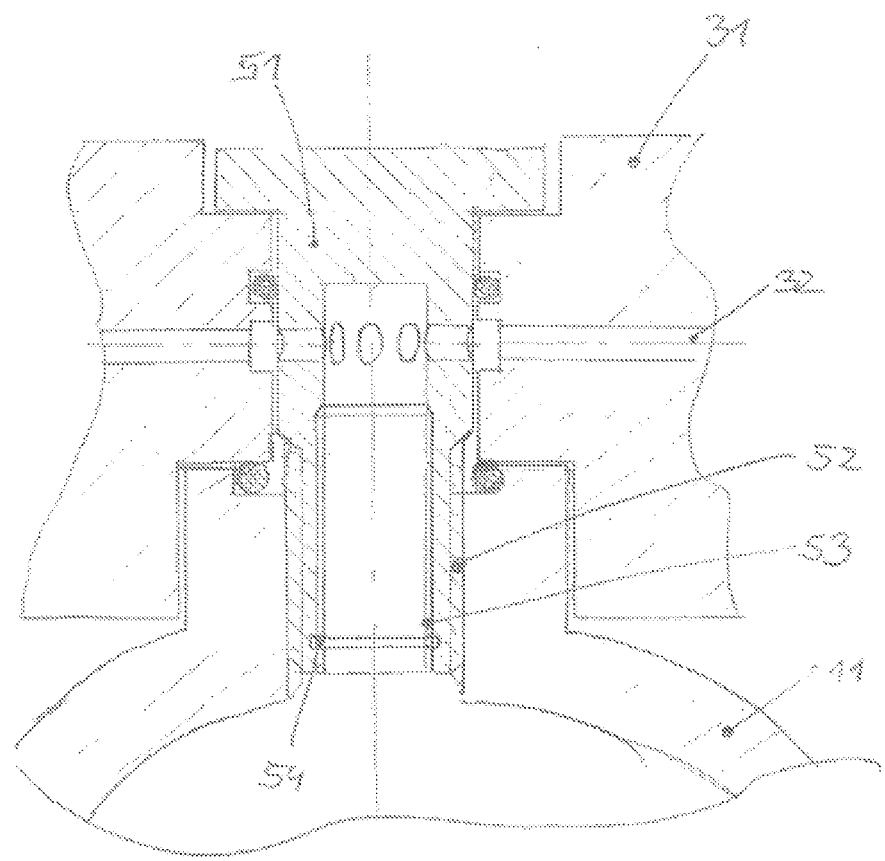

FIG. 3 illustrates a diagrammatic depiction of a connection between pressure accumulators 11 and the connecting device 31. A hollow screw 51 is used for the connection and is fastened via an external thread 52 on the pressure accumulator 11. The internal thread 53 of the hollow screw 51 serves to receive valves and/or filters close to the cylinder. Also, however, other fixing methods are possible. Thus, the valves and/or filters close to the cylinder may, for example, be fixed via undercuts 54 on the hollow bolt 51 by way of locking rings.

FIGS. 4 to 7 illustrate diagrammatic depictions of embodiments of the connection in accordance with embodiments between the pressure accumulator 10 and the connecting device 31 from the front.

Figure 4:
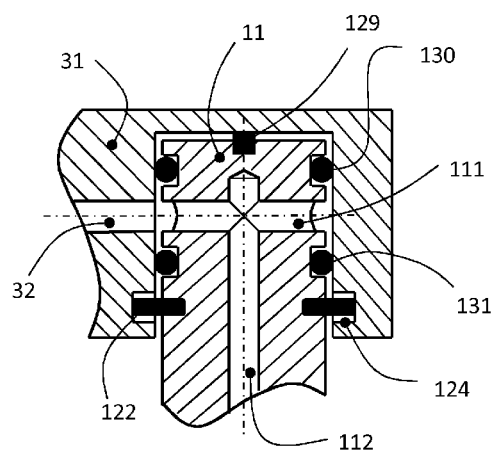

FIG. 4 illustrates the connection between the pressure accumulator 11 or a connecting segment of the pressure accumulator 11 and the connecting device 31 or a connection block of the connecting device 31 as a clamp connection or push-fit connection. Clamping takes place by way of a clamp connecting element 122 which is designed as a crescent-shaped locking ring and is established in a groove of the connecting device 31. Here, the groove has a movement space 124 for the locking ring in the axial direction.

In the connecting segment of the pressure accumulator 11, an axial bore 112 leads out of the interior of the pressure accumulator 11 in the direction of an outer limit of the connecting segment of the pressure accumulator 11. This axial bore 112 is intersected by a transverse bore 111 so that a fluid flow from the axial bore 112 may be conducted further via the transverse bore 111. The transverse bore 111 extends to the end of the connecting segment of the pressure accumulator 11 so that via the transverse bore 111, a connection is created between the interior of the pressure accumulator 11 and the environment of the pressure accumulator 11, and thus fluid may pass via the transverse bore 111 into the pressure accumulator 11 and emerge therefrom.

The transverse bore 111 is oriented such that it opens into the bore 32 of the connecting device. This mutual orientation of the bores 111 and 32 is facilitated in particular by the push-fit connection, in contrast in particular to screw connections. Furthermore, the radial orientation of the pressure accumulator 11 is ensured via the centring element 129, for example a centring bolt. Sealing rings 130 or 131 are arranged on both sides of the transverse bore 111 between the connecting segment of the pressure accumulator 11 and the connection block of the connecting device 31.

Figure 5:
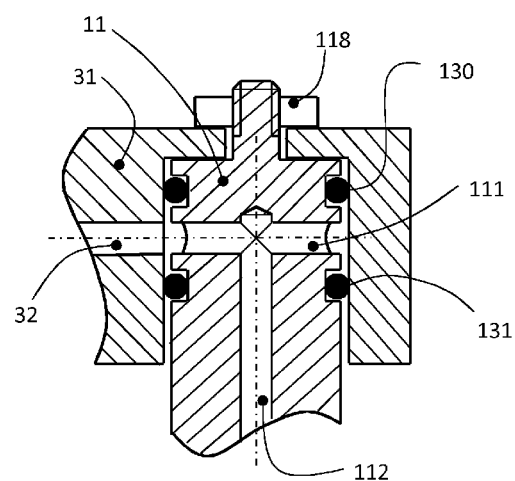

In the embodiment illustrated in FIG. 5, the connection between the pressure accumulator 11 and the connecting device 31 is secured via a nut 118.

Figure 6:
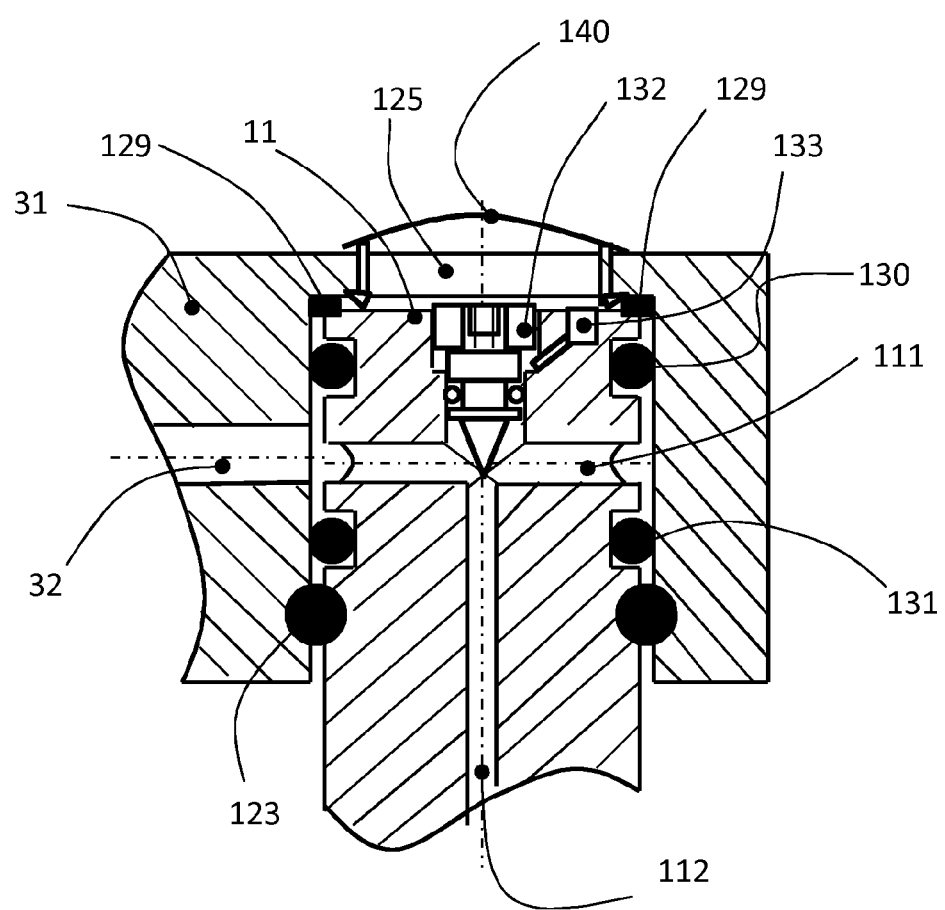

In the embodiment illustrated in FIG. 6, the connection between the pressure accumulator 11 and the connecting device 31 is created via a screw connection element 123, however, the connection may also be designed as a push-fit connection. The connection also uses centring elements 129. In this embodiment the axial bore 112 is designed continuous as a through opening.

Furthermore, the connecting device 31 has an opening 125 in the region of the open end of the axial bore 112 so that components such as, for example, a manual valve may be screwed into or inserted in the opening. In the opening of the axial bore 112 is a screw 132 which in the planar position to the accumulator 11 seals the opening towards the outside and opens the bores 111, 112, or in fully screwed in state seals the axial bore 112 against the transverse bore 111. In a defined state of the screw 132 this exposes an additional opening 133 towards the outside. The additional opening 133 is formed such that for example a service line may be screwed in. The opening 125 may be covered via a cover 140 of plastic or sheet metal which is designed such that on damage to the seal, in particular the sealing ring 130, it curves outward or tears. The cover 140 is furthermore designed such that non-destructive dismantling is not possible, and thus, unauthorised access is prevented or made evident.

Figure 7:
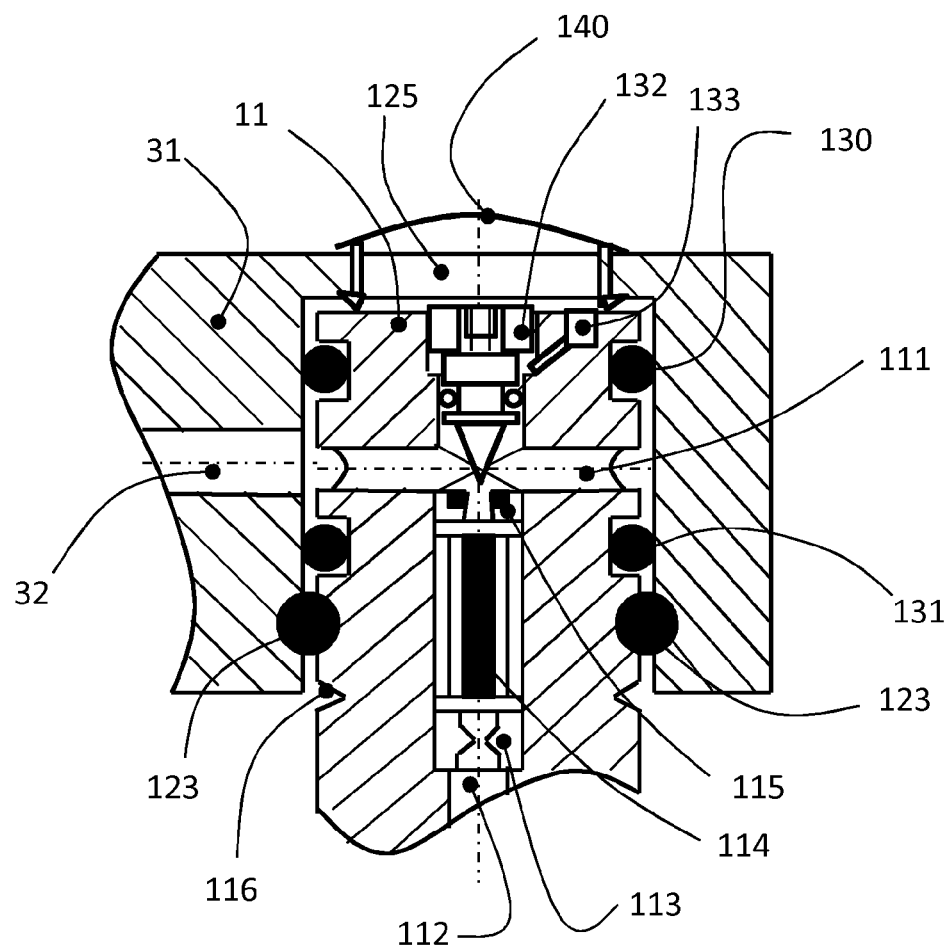

In the embodiment illustrated in FIG. 7, the connecting segment of the pressure accumulator 11 also has a nominal break point 116 and a flow limiter 113 which are arranged such that the flow limiter 113 remains in the pressure accumulator 11 on breakage at the nominal break point 116. The axial bore 112 is designed such that a flow limiter 113 and/or a filter 114 and/or a sealing seat 115 may be screwed in or inserted.

FIG. 8 illustrates a diagrammatic depiction of an embodiment of the connection between the pressure accumulator 11 and the connecting device 31 from above. Here, as clamp connecting elements 122, bolts are arranged in bores 126 which overlap with the groove of the pressure accumulator 11. The design is arranged such that by way of the free-standing receiver 127 for the assembly or disassembly tool and the bore 128, rapid assembly or disassembly is possible.

FIG. 9 illustrates a diagrammatic depiction of a further embodiment of the connection between the pressure accumulator 11 and the connecting device 31 from above. Here, as screw connecting elements 123, screws are used on which the thread is produced only along part of the screw length. The front part of the connecting element 123, which ensures the retention of the pressure accumulator 11 at the connecting device 31, is formed as a thread-free bolt. Thus, with corresponding dimensioning of the groove, a movement space is ensured for the connecting element 123 and thus a play achieved for the pressure accumulator 11 mounted in the connecting device 31. Seals 141, 142 are evident on the screw connecting elements 123. These seals may be provided, for example, by paint or weld points.

The invention thus discloses a simple and secure connection between one or more pressure accumulators and a connecting device.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

10 Pressure accumulator assembly
11 Pressure accumulator
12 Valve block
21 Pressure reducer
22 Valve block
23 Cylinder valve
24 Service valve
31 Connecting device
32 Bore
33 Filling valve unit
34 Extraction valve unit
37 Cross section reductions
41 Fixing point, suspended design
42 Fixing point, standing design
43 Rubber mounting
50 Screw connection
51 Hollow screw
52 External thread
53 Internal thread
54 Internal undercut
111 Transverse bore
112 Axial bore
113 Flow limiter
114 Filter
115 Sealing seat
116 Nominal break point
118 Nut
122 Clamping connecting element
123 Screw connecting element
124 Movement space
125 Opening
126 Bore
127 Free-standing receiver
128 Bore
129 Centring element
130 Sealing ring
131 Sealing ring
132 Screw
133 Opening
140 Cover
141 Seal
142 Seal

What is claimed is:

1. A pressure accumulator assembly for a motor vehicle, the pressure accumulator assembly comprising:
    at least two pressure accumulators having a first connecting segment at a first end, and a second connecting segment at a second end opposite to the first end, the first connecting segment and the second connecting segment each having an axial bore and a traverse bore which intersects the axial bore permitting fluid flow therethrough;
    a connecting device mounted to the motor vehicle, the connecting device having a first connecting element having a first connecting element groove to receive a first clamp connecting element and thereby connect the first connecting element fluid-conductively to the at least two pressure accumulators at the traverse bore of the first connecting segment upon insertion of the at least two pressure accumulators into an opening at the first connecting element, and a second connecting element having a second connecting element groove to receive a second clamp connecting element and thereby connect the second connecting element fluid-conductively to the at least two pressure accumulators at the traverse bore of the second connecting segment upon insertion of the at least two pressure accumulators into an opening at the first connecting element;
    sealing rings arranged on the at least two pressure accumulators at both sides of the traverse bore to establish a seal between the at least two pressure accumulators and the connecting device; and at least one centering element arranged between the connecting device and the at least two pressure accumulators upon insertion of the at least two pressure accumulators into the first connecting element and the second connecting element to maintain a radial orientation of the at least two pressure accumulators relative to the connecting device.

2. The pressure accumulator assembly of claim 1, wherein the first clamp connecting element and the second clamp connecting element respectively comprises a spring element.

3. The pressure accumulator assembly of claim 2, wherein the first connecting element groove and the second connecting element groove respectively includes an axial movement space to receive the spring element.

4. The pressure accumulator assembly of claim 1, further comprising a cover to cover the opening and indicate a state of sealing of the at least two pressure accumulators.

5. The pressure accumulator assembly of claim 1, further comprising a valve arranged in the axial bore.

6. The pressure accumulator assembly of claim 1, further comprising a nominal break point in the first connecting segment and the second connecting segment.

7. The pressure accumulator assembly of claim 6, further comprising a flow limiter arranged in the at least one pressure accumulator so as to remain in the at least two pressure accumulators upon breakage at the nominal break point.

8. The pressure accumulator assembly of claim 1, further comprising fixing points on the first and second connecting elements to mount the connecting device to the motor vehicle.

9. The pressure accumulator assembly of claim 1, further comprising a filling valve unit and/or an extraction valve unit arranged in or on the connecting device.

10. A pressure accumulator assembly for a motor vehicle, the pressure accumulator assembly comprising:
   a connecting device including a first connecting element having first fixing ends to mount the connecting device to the motor vehicle, a first connecting element groove to receive a first clamp connecting element, and a first transverse bore to permit a fluid flow therethrough, and a second connecting element having a second fixing ends to mount the connecting device to the motor vehicle, a second connecting element groove to receive a second clamp connecting element, and a second traverse bore to permit fluid flow therethrough;
   at least two pressure accumulators having a first connecting segment at a first end, and a second connecting segment at a second end opposite to the first end, the first connecting segment having a third transverse bore in a fluid-conductive connection with the second transverse bore of the first connecting element upon insertion of the at least two pressure accumulators into an opening at the first connecting element and clamping of the at least two pressure accumulators by the first clamp connecting element, and the second connecting segment having a fourth transverse bore in a fluid-conductive connection with the second transverse bore of the second connecting element upon insertion of the at least two pressure accumulators into an opening at the second connecting element and clamping of the at least two pressure accumulators by the second clamp connecting element; and
   at least one centering element arranged between the connecting device and the at least two pressure accumulators to maintain a radial orientation of the at least two pressure accumulators relative to the connecting device.

11. The pressure accumulator assembly of claim 10, wherein the first clamp connecting element and the second clamp connecting element respectively comprises a spring element.

12. The pressure accumulator assembly of claim 11, wherein the first connecting element groove and the second connecting element groove respectively includes an axial movement space to receive the spring element.

13. The pressure accumulator assembly of claim 10, further comprising a cover to cover the opening and indicate a state of sealing of the at least two pressure accumulators.

14. The pressure accumulator system of claim 10, further comprising sealing rings on both sides of the traverse bore to establish a seal between the at least two pressure accumulators and the connecting device.

15. The pressure accumulator assembly of claim 10, further comprising a valve arranged in the axial bore.

16. The pressure accumulator assembly of claim 10, further comprising:
   a nominal break point in the first connecting segment and the second connecting segment; and
   a flow limiter arranged in the at least one pressure accumulator so as to remain in the at least two pressure accumulators upon breakage at the nominal break point.

17. A pressure accumulator assembly for a motor vehicle, the pressure accumulator assembly comprising:
   a connecting device including a first connecting element having the first fixing ends to mount the connecting device to the motor vehicle, a first connecting element groove to receive a first clamp connecting element, and a first traverse bore to permit a fluid flow therethrough, and a second connecting element having second fixing ends to mount the connecting device to the motor vehicle, a first connecting element groove to receive a first clamp connecting element, and a second transverse bore to permit fluid flow therethrough; and
   a plurality of pressure accumulators with a push-fit or clamp connection to the connecting device, and having a first connecting segment at a first end thereof, and a second connecting segment at a second end opposite to the first end, the first connecting segment having a third transverse bore in a fluid-conductive connection with the second transverse bore of the first connecting element upon insertion of the pressure accumulators into an opening at the first connecting element and clamping of the pressure accumulators by the first clamp connecting element, and the second connecting segment having a fourth transverse bore in a fluid-conductive connection with the second transverse bore of the second connecting element upon insertion of the pressure accumulators into an opening at the second connecting element and clamping of the pressure accumulators by the second clamp connecting element.

* * * * *